US009230242B2

(12) United States Patent
Zhang et al.

(10) Patent No.: US 9,230,242 B2
(45) Date of Patent: Jan. 5, 2016

(54) WORKING CONTEXT FOR BUSINESS APPLICATIONS

(75) Inventors: Huiming Zhang, Shanghai (CN); Yiqun Shuai, Shanghai (CN); Changhai Cao, Shanghai (CN); Kai Bi, Shanghai (CN); Qiang Wang, Shanghai (CN); Liyu Guo, Shanghai (CN); Yujia Wang, Shanghai (CN)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 13/550,944

(22) Filed: Jul. 17, 2012

(65) Prior Publication Data

US 2013/0326414 A1 Dec. 5, 2013

(30) Foreign Application Priority Data

Jun. 1, 2012 (CN) .......................... 2012 1 0179709

(51) Int. Cl.
*G06F 3/048* (2013.01)
*G06Q 10/10* (2012.01)

(52) U.S. Cl.
CPC ...................................... *G06Q 10/10* (2013.01)

(58) Field of Classification Search
CPC .... G06Q 10/10; G06Q 10/101; G06F 3/0482; G06F 3/0484
USPC ......................................... 715/747, 811, 835
See application file for complete search history.

(56) References Cited

U.S. PATENT DOCUMENTS

| 7,113,941 | B2 * | 9/2006 | Arend et al. | |
| 7,464,072 | B1 * | 12/2008 | Subramaniam et al. | |
| 8,793,591 | B1 * | 7/2014 | Coleman et al. | 715/752 |
| 2004/0162816 | A1 * | 8/2004 | Irle et al. | 707/3 |
| 2005/0228790 | A1 * | 10/2005 | Ronnewinkel et al. | 707/6 |
| 2005/0234959 | A1 * | 10/2005 | Ronnewinkel et al. | 707/102 |
| 2006/0026145 | A1 * | 2/2006 | Beringer et al. | 707/3 |
| 2007/0032992 | A1 | 2/2007 | Trowbridge et al. | |
| 2009/0158135 | A1 | 6/2009 | Dittmar et al. | |
| 2011/0093487 | A1 | 4/2011 | Le Biannic et al. | |

OTHER PUBLICATIONS

Andrew Moedinger, "New! Pick your favorite inbox style," Jul. 7, 2011, Official Gmail Blog, available at <http://web.archive.org/web/20110709071023/http://gmailblog.blogspot.com/2011/07/new-pick-your-favorite-inbox-style.html>.*

"Creating business objects using the New Business Object wizard", (C) Copyright IBM Corporation 2005, 2008., [Online]. Retreived from the Internet: <URL: http://publib.boulder.ibm.com/infocenter/dmndhelp/v6r1mx/index.jsp?topic=/com.ibm.wbit.610.help.bo.ul.doc/topics/tbowizard.html, (Accessed Apr. 16, 2012), 1 pg.

(Continued)

*Primary Examiner* — Doon Chow
*Assistant Examiner* — Andrew T Chiusano
(74) *Attorney, Agent, or Firm* — Schwegman Lundberg & Woessner, P.A.

(57) ABSTRACT

A working context is implemented for a business application by associating business objects with context categories that organize a user's favorite business objects. A working context that is specified by including at least one of the defined business categories can be applied to a business application by providing the corresponding favorite business objects to the business application for an execution of the business application.

20 Claims, 10 Drawing Sheets

(56) References Cited

OTHER PUBLICATIONS

"Global Attribute Tag—SAP Documentation", [Online]. Retrieved from the Internet: <URL: http://help.sap.com/saphelp_crm700_ehp01/helpdata/EN/2e/f5da3649e043fe82fd7a18ec192d14/frameset.htm, (Accessed Apr. 16, 2012), 2 pgs.

"Conosolut—Define Working Context Profiles", © Copyright 2011 consulut international ag., [Online]. Retrieved from the Internet: <URL: (http://www.consolut.com/en/s/sap-ides-access/d/s/doc/YY-WCF_WCTXTVC_PROFILE, (Accessed Apr. 16, 2012), 2 pgs.

* cited by examiner

WORKING CONTEXT FOR BUSINESS APPLICATIONS

CLAIM OF PRIORITY

The present patent application claims the priority benefit of the filing date of Chinese Patent Application (SIPO) No. 201210179709.3 filed Jun. 1, 2012, the entire content of which is incorporated herein by reference.

BACKGROUND

1. Technical Field

The present disclosure relates generally to software and more particularly to software directed to business applications.

2. Description of Related Art

A business software user typically has responsibility for a limited set of business objects that contain relevant business data (e.g., accounting data for accounting applications). However, identifiers for these relevant business objects may need to be entered manually when the user executes a corresponding business application. This results in processes that are inefficient and error prone. Thus, there is a need for improved methods and related systems that implement a working context that includes relevant business objects for business applications.

DETAILED DESCRIPTION OF EXAMPLE EMBODIMENTS

Figure 1:
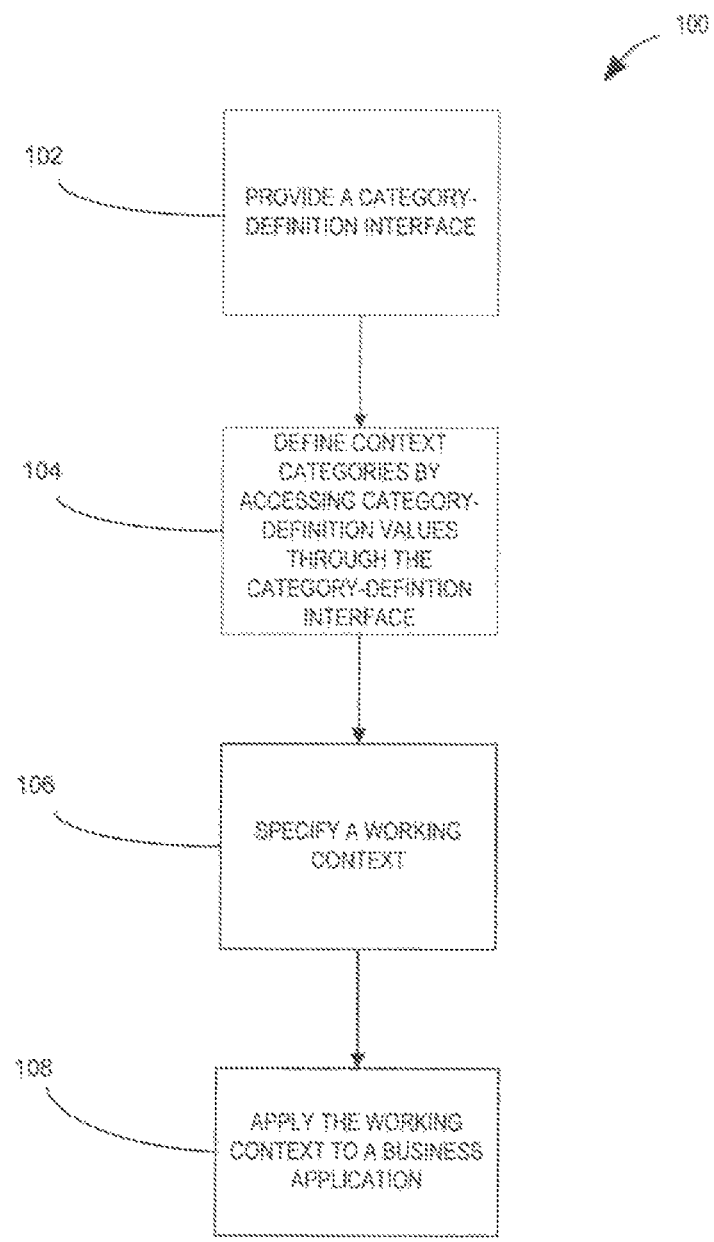
FIG. 1 is a flowchart that shows a method of implementing a working context for business applications according to an example embodiment.

FIG. 1 shows a flowchart that illustrates a method 100 of implementing a working context for business applications according to an example embodiment. A first operation 102 includes providing a category-definition interface for associating one or more favorite business objects with one or more context categories. The category-definition interface includes a context-category menu and a business-object menu. The context-category menu includes context categories, where each context category is selectable for associating favorite business objects with that context category. The business-object menu includes one or more business objects corresponding to a selected context category from the context-category menu, where the business-object menu includes for each business object a selectable favorite-business-object indicator that indicates whether that business object is a favorite business object for the selected context category.

Figure 2:
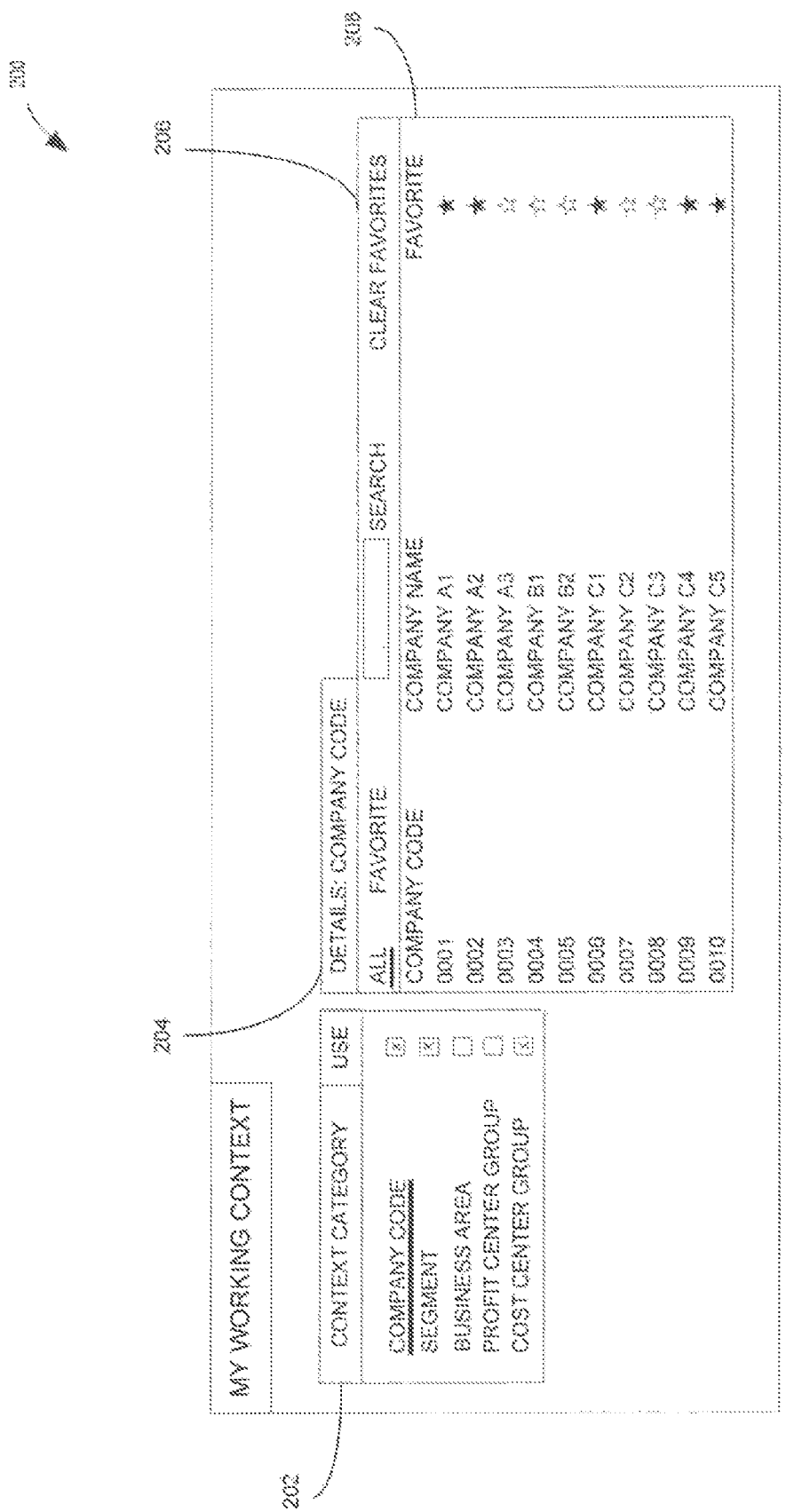
FIG. 2 is a diagram that shows an example category-definition interface related to the embodiment shown in FIG. 1.

FIG. 2 shows an example category-definition interface 200 described as "My Working Context." A context-category menu 202 includes five context categories including "company code," "segment," "business area," "profit center group," and "cost center group." Typically a company code identifies a company, a segment identifies a product, a business area identifies a geographic region, a profit center group identifies a source of cash inflow, and a cost center group identifies a source of cash outflow. The "use" column defines the working context as discussed below by identifying one or more categories to be included in the working context. Here the company code, the segment, and the cost center are included.

The context-category menu 202 also shows that the "company code" category has been highlighted (indicated by underlining) to show that this context category has been selected for interaction with the business-object menu 204. The business-object menu 204 for the selected context category, the company code in this example, has a top-level menu 206 that includes "all" for showing all business objects, "favorite" for showing favorite business objects only, a "search" option for identifying specific business options, and an option to "clear favorites" among the relevant business objects. The top-level menu 206 indicates that the option for all business objects has been selected (indicated by the underlining), and the business-object listing 208 includes a company code, a company name and an favorite-business-object indicator, where a filled-in or solid star indicates that the business object is a favorite business object.

In FIG. 2, the business objects relate to a company name with a corresponding company code (e.g., company code 0001 refers to company A1). In general, each business object includes at least one attribute that corresponds to business-object data (e.g., company related data). A business object may refer to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of that business entity.

Figure 3:
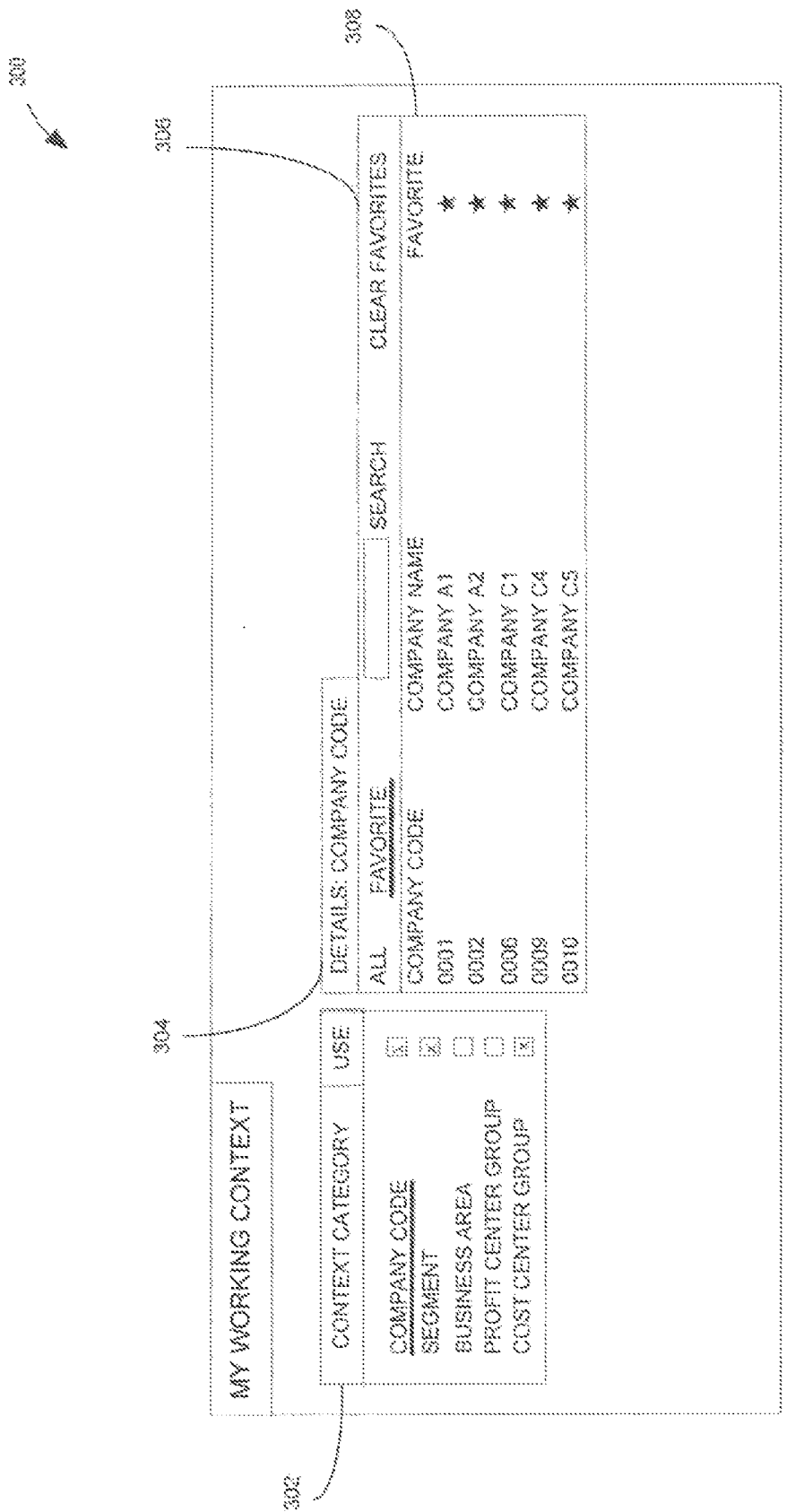
FIG. 3 is another diagram that shows an example category-definition interface related to the embodiment shown in FIG. 1.

FIG. 3 shows the category-definition interface 300 for the business-object data shown in FIG. 2 but with different display settings. In FIG. 3 the category-definition interface 300 includes the context-category menu 302 and the business-object menu 304 similarly as in FIG. 2. However, the top-level menu 306 of the business-object menu 304 indicates that the option for favorite business objects has been chosen (indicated by the underlining) so that the business-object listing 308 includes only favorite business objects as indicated by the filled-in stars in the "favorite" column.

Figure 4:
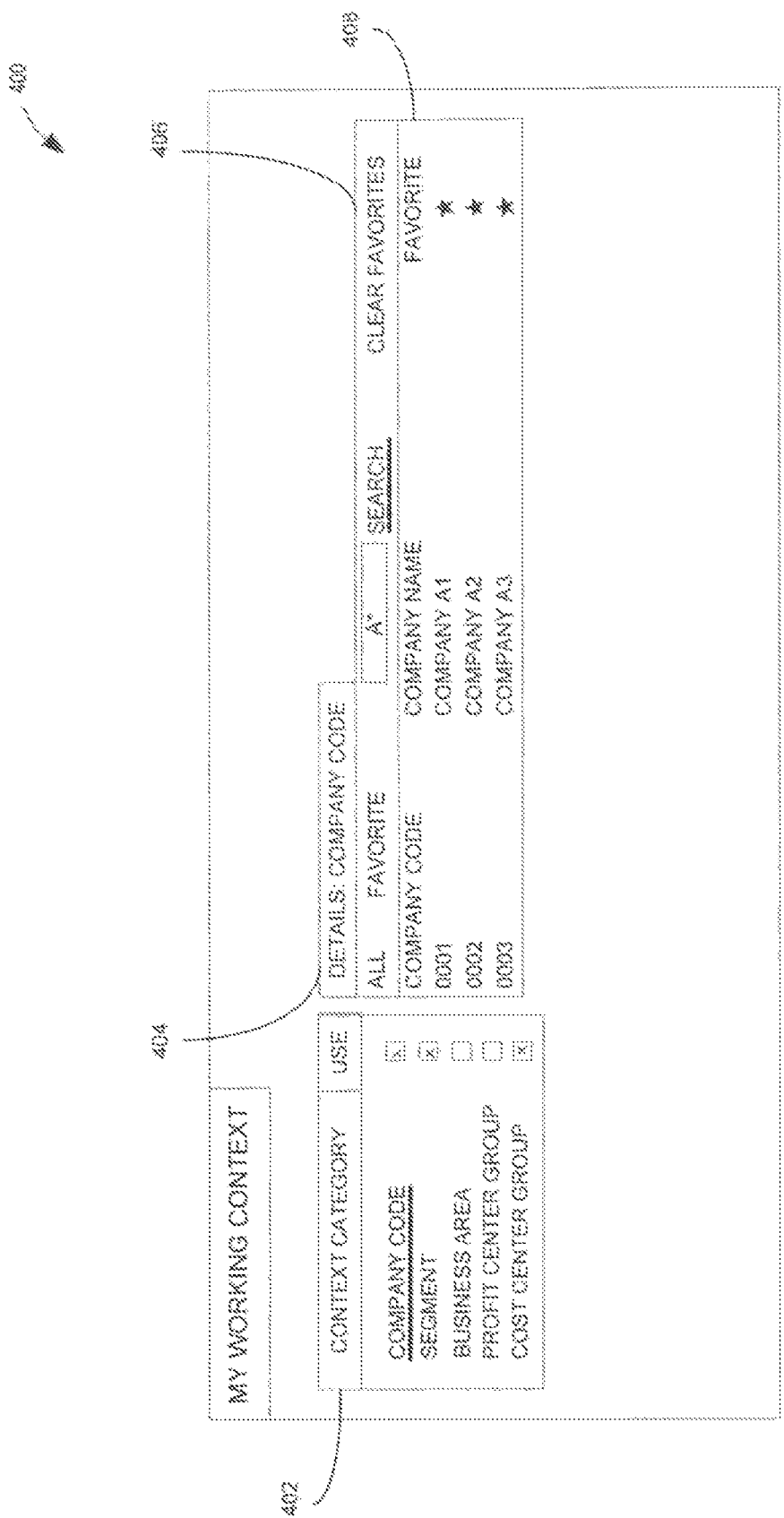
FIG. 4 is another diagram that shows an example category-definition interface related to the embodiment shown in FIG. 1.

FIG. 4 shows the category-definition interface 400 for the business-object data shown in FIGS. 2 and 3 but with different display settings. In FIG. 4 the category-definition interface 400 includes the context-category menu 402 and the business-object menu 404 similarly as in FIGS. 2 and 3. However, the top-level menu 406 of the business-object menu 404 indicates that the option for searching business objects for strings beginning with "A" has been chosen (indicated by the underlining) so that the business-object listing 408 includes only companies identified by the string search (e.g., companies A1, A2, and A3).

Figure 5:
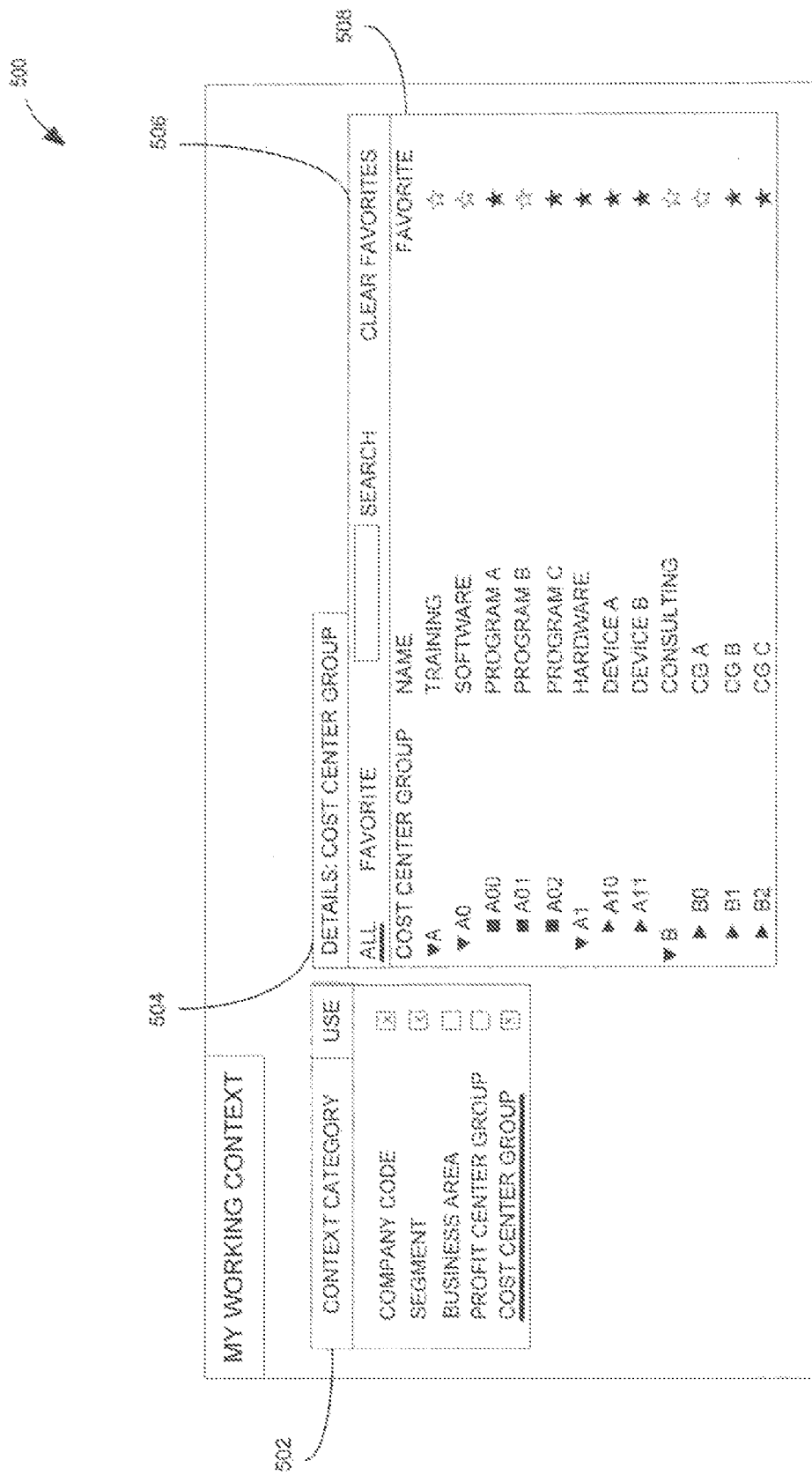
FIG. 5 is another diagram that shows an example category-definition interface related to the embodiment shown in FIG. 1.
Figure 6:
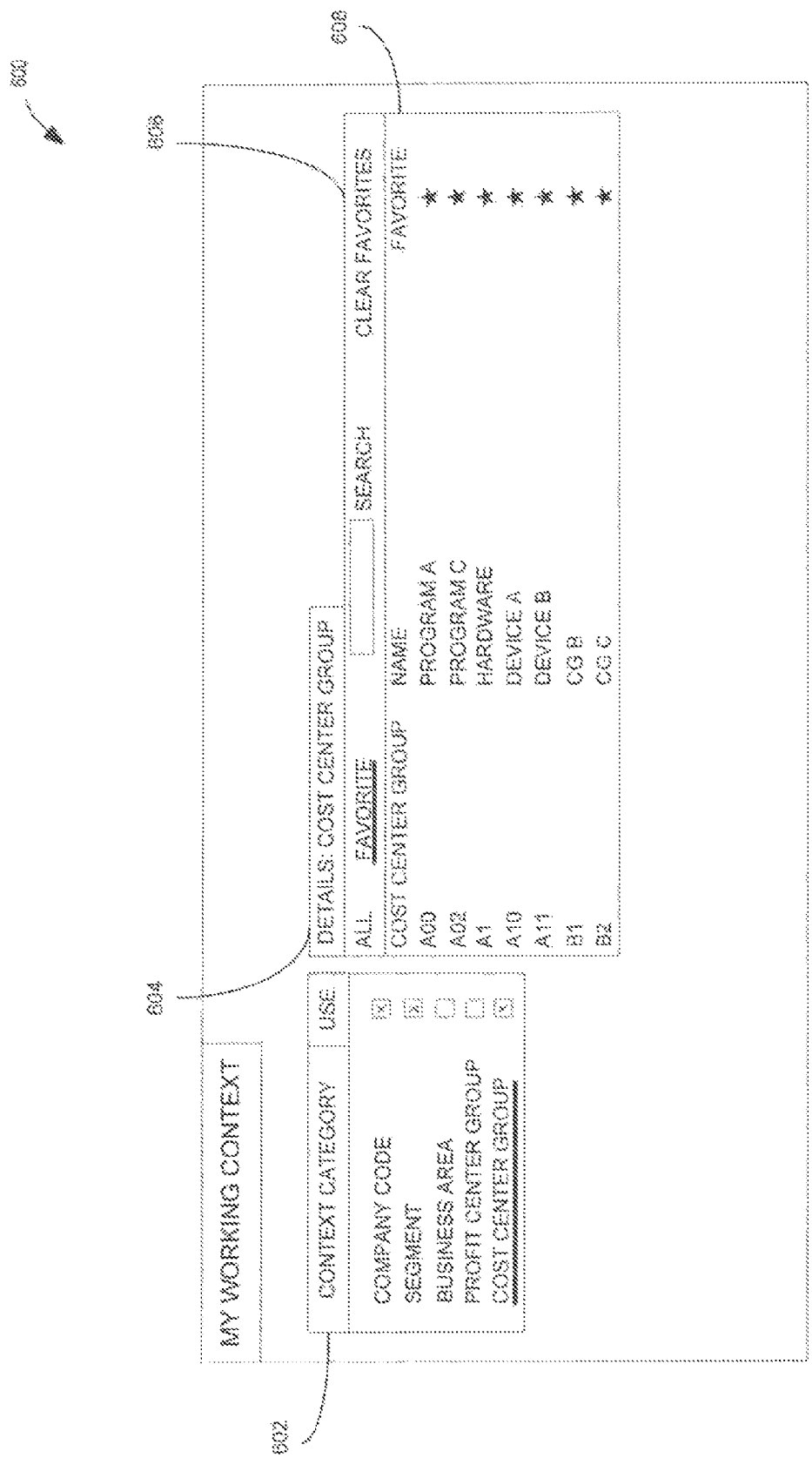
FIG. 6 is another diagram that shows an example category-definition interface related to the embodiment shown in FIG. 1.

The business-object menus 204, 304, 404, in FIGS. 2, 3 and 4 apply similarly when the selected context category in the context-category menus 202, 302, 402 is "segment," which typically refers to a product, or "business area," which typically refers to a geographical area. FIGS. 5 and 6 illustrate display options for hierarchical structures that may be relevant when the selected context category in the context-category menus 202, 302, 402 is "profit center group," which typically identifies a source of cash inflow, or "cost center group," which typically identities a source of cash outflow.

FIG. 5 shows a category-definition interface 500 that includes a context-category menu 502 and a business-object menu 504 similarly as in FIG. 2. As indicated in the context-category menu 502, the "cost center group" category has been selected (indicated by underlining) for interaction with the business-object menu 504. The business-object menu 504 for the selected context category, the cost center group in this example, has a top-level menu 506 that includes options as in FIGS. 2, 3, and 4, where the option for all business objects has been selected (indicated by the underlining), and the business-object listing 508 includes a cost-center-group code, a corresponding group name, and an favorite-business-object indicator, where a filled-in star indicates that the business object is a favorite business object.

The cost-center-group codes in the business-object listing 508 are shown in a hierarchical scheme that includes options for expanding or contracting the hierarchical elements. For example, the first line (group A, "training") includes a downward-pointing triangle that indicates that this element's hierarchy has been expanded, the seventh line (group A10, "device A") has a rightward-pointing triangle that indicates that this element's hierarchy has not been expanded (but could be with a user-interface selection), and the third line (group A00, "Program A") has a square that indicates that this element has no further hierarchical expansion.

FIG. 6 shows the category-definition interface 600 for the business-object data shown in FIG. 5 but with different display settings. In FIG. 6 the category-definition interface 600 includes the context-category menu 602 and the business-object menu 604 similarly as in FIG. 5. However, the top-level menu 606 of the business-object menu 604 indicates that the option for favorite business objects has been chosen (indicated by the underlining) so that the business-object listing 608 includes only favorite business objects as indicated by the filled-in stars in the "favorite" column. Additionally, the hierarchical display scheme shown in the context-category menu 506 of FIG. 5 has been replaced by a non-hierarchical display.

A second operation 104 in FIG. 1 includes defining a plurality of context categories by accessing category-definition values through the category-definition interface 200 of FIG. 2, where each context category is associated with one or more favorite business objects. For example, context categories may include company code, segment, business area, profit center group, or cost center group as shown in the context-category menu 202 of FIG. 2.

A third operation 106 in FIG. 1 includes specifying a working context that includes at least one identified context category from the plurality of context categories by accessing working-context values that identify at least one context category from the plurality of context categories. For example, as illustrated in FIG. 2, the working context may include the context categories given by company code, segment, and profit center group as indicated by the x-marks in the "use" column. Although these context categories are selected as part of the context-category menu 202 of the category-definition interface 200 of FIG. 2, a separate selection mechanism may be used for this purpose.

A fourth operation 108 in FIG. 1 includes applying the working context to a business application by providing the one or more favorite business objects corresponding to the at least one identified context category to the business application for an execution of the business application. Applying the working context to the business application may include automatically pre-filling the one or more business objects corresponding to the at least one identified context category into corresponding fields of the business application. In cases where a relevant context category includes multiple options, the interface may include menu options either before executing the business application or within the execution of the business application. In many operational settings, context categories and working contexts are defined and associated with individual user accounts, and so applying the working context to the business application may include identifying the working context associated with the user who executes the business application.

Figure 7:
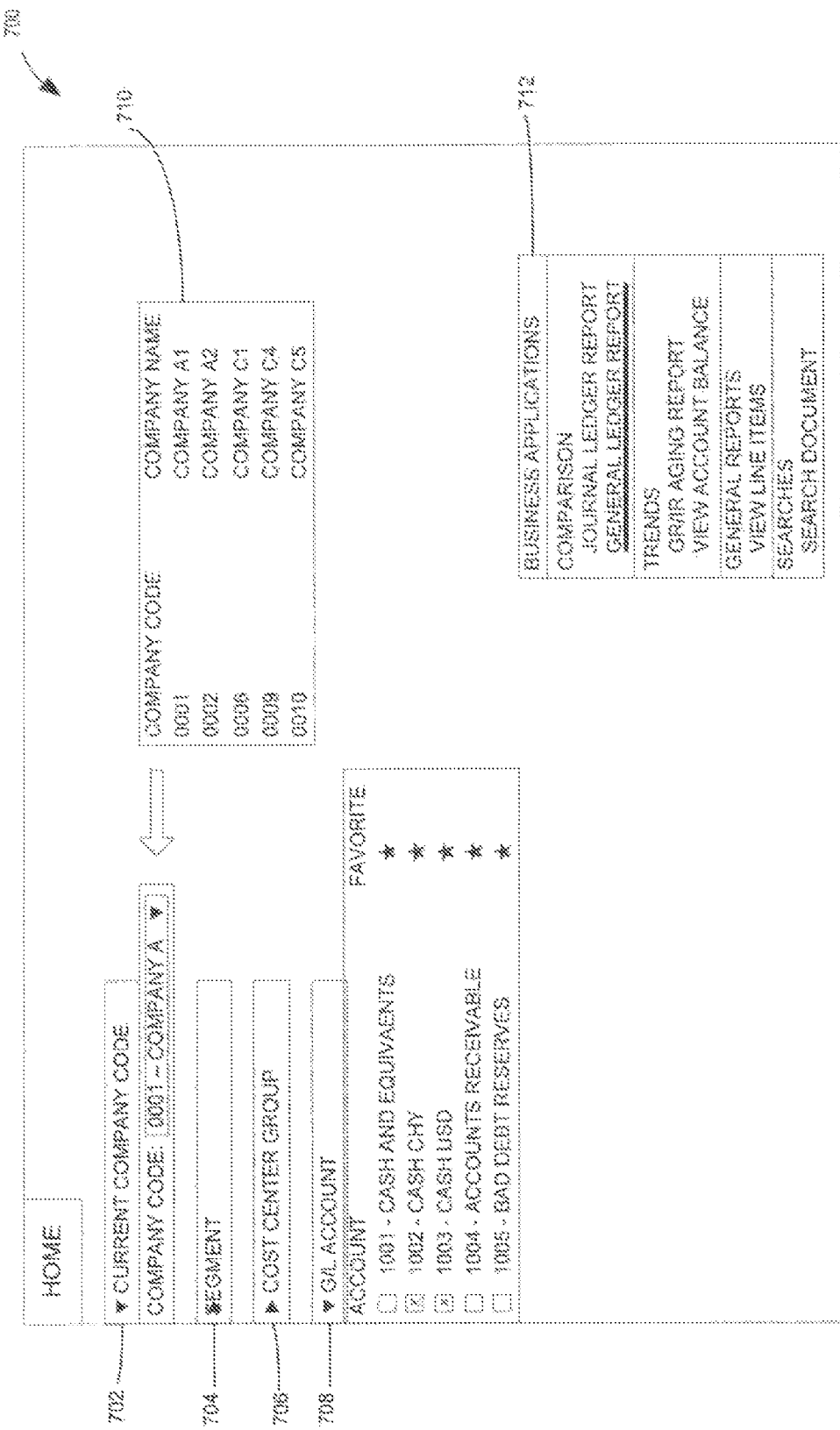
FIG. 7 is a diagram that shows an example user interface related to the embodiment shown in FIG. 1.

FIG. 7 shows a user interface 700 (e.g., a home page) associated with a user having a working context that includes business objects for the company code, the segment, and the cost center group as illustrated in the "use" column of the context-category menu 202 of FIG. 2. The user interface 700 then includes a company-code menu 702, a segment menu 704, and a cost-center-group menu 706 that imports business objects corresponding to the selected context categories. For example, FIG. 7 shows a pop-up business-object menu 710 corresponding to the company code favorites listed in FIGS. 2 and 3, where this pop-up menu may be generated by a selection operation (e.g., mouse click) in the user interface. FIG. 7 also shows a general-ledger-account menu 108 that lists favorite genera) ledger (G/L) accounts associated with the user. In this case, two general ledger accounts (1002—cash CHY [Chinese Yen], 1003—cash USD [U.S. Dollar]) have been selected for the business application.

Figure 8:
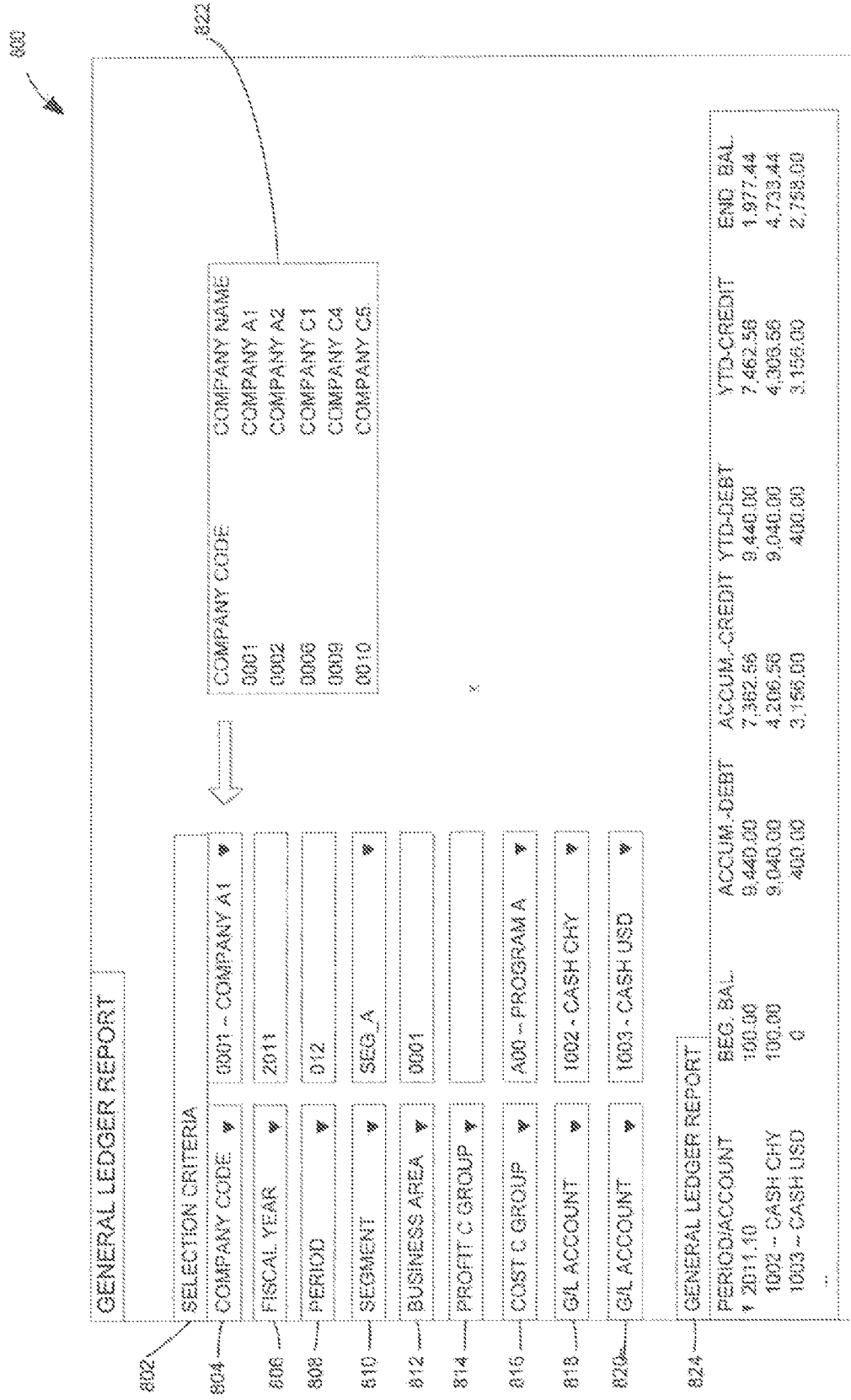
FIG. 8 is a diagram that shows an example business-application interface related to the embodiment shown in FIG. 1.

FIG. 7 also shows a business-applications menu 712 that includes several business applications, where a general ledger report comparison has been selected (indicated by underlining) for applying the working context to the selected general ledger accounts. FIG. 8 shows the general-ledger-report screen 800 corresponding to this selection. A selection-criteria menu 802 includes multiple selectable criteria including criteria labels and criteria values, where the criteria labels may be selectable from a list of acceptable business-object inputs (e.g., company code, segment, G/L account, etc.) and the criteria values may be selectable from menus that include favorite business objects associated with the corresponding criteria labels. For example, the first criterion 804 has been labeled as the company code, and a default value ("0001—Company A") has been taken from the favorites associated with this context category. Additionally, FIG. 8 shows a pop-up business-object menu 822 corresponding to the company code favorites listed in FIGS. 2 and 3, where this pop-up menu may be generated by a selection operation (e.g., mouse click) in the user interface.

FIG. 8 shows additional criteria 806, 808, 810, 812, 814, 816, 818, 820 including fiscal year, period, segment, business area, profit center group, cost center group, and general ledger accounts. Labels for these criteria may be set by the business application or by user input. Values for these criteria may be set by user input in the application or by menu selection as illustrated by the business-object menu 822 corresponding to company code favorites associated with the user's working context. As shown in FIG. 8, selectable value menus are available for criteria corresponding to favorite business objects in the user's working context including the company code, segment, and cost center group (e.g., as in FIG. 2) and the two general ledger accounts (e.g., as in FIG. 7). Depending on the operational setting, additional menus may be added independently of the user's working context (e.g., a menu for fiscal year). FIG. 8 also shows a general ledger report 824 that corresponds to the selection criteria.

Figure 9:
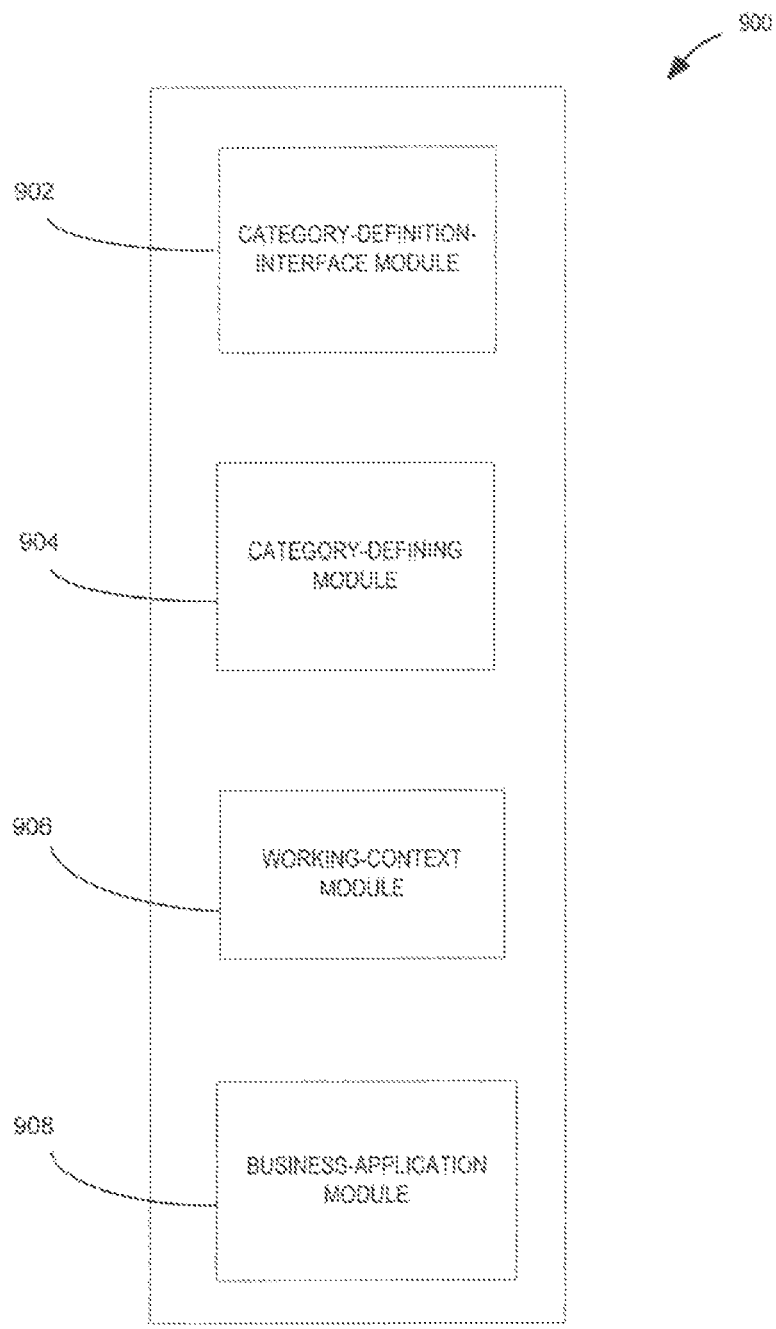
FIG. 9 is a block diagram that shows a schematic representation of an apparatus for an example embodiment.

Additional embodiments correspond to systems and related computer programs that carry the above-described methods. FIG. 9 shows a schematic representation of an apparatus 900, in accordance with an example embodiment for implementing a working context for business applications. In this case, the apparatus 900 includes at least one computer system (e.g., as in FIG. 10) to perform software and hardware operations for modules that carry out aspects of the method 100 of FIG. 1.

In accordance with an example embodiment, the apparatus 900 includes a category-definition-interface module 902, a category-defining module 904, a working-context module 906, and a business-application module 908. The category-definition-interface module 902 operates to provide a category-definition interface for associating one or more favorite business objects with one or more context categories. The category-definition interface includes a context-category menu that includes a plurality of context categories, where each context category is selectable for associating favorite business objects with that context category, and a business-object menu that includes one or more business objects corresponding to a selected context category, where the business-object menu includes for each business object, a selectable favorite-business-object indicator that indicates whether that business object is a favorite business object for the selected context category.

The category-defining module 904 operates to define a plurality of context categories by accessing category-definition values through the category-definition interface, where each context category is associated with one or more favorite business objects. The working-context module 906 operates to specify a working context that includes at least one identified context category from the plurality of context categories by accessing working-context values that identify at least one context category from the plurality of context categories. The business-application module 908 operates to apply the working context to a business application by providing the one or more favorite business objects corresponding to the at least one identified context category to the business application for an execution of the business application.

Figure 10:
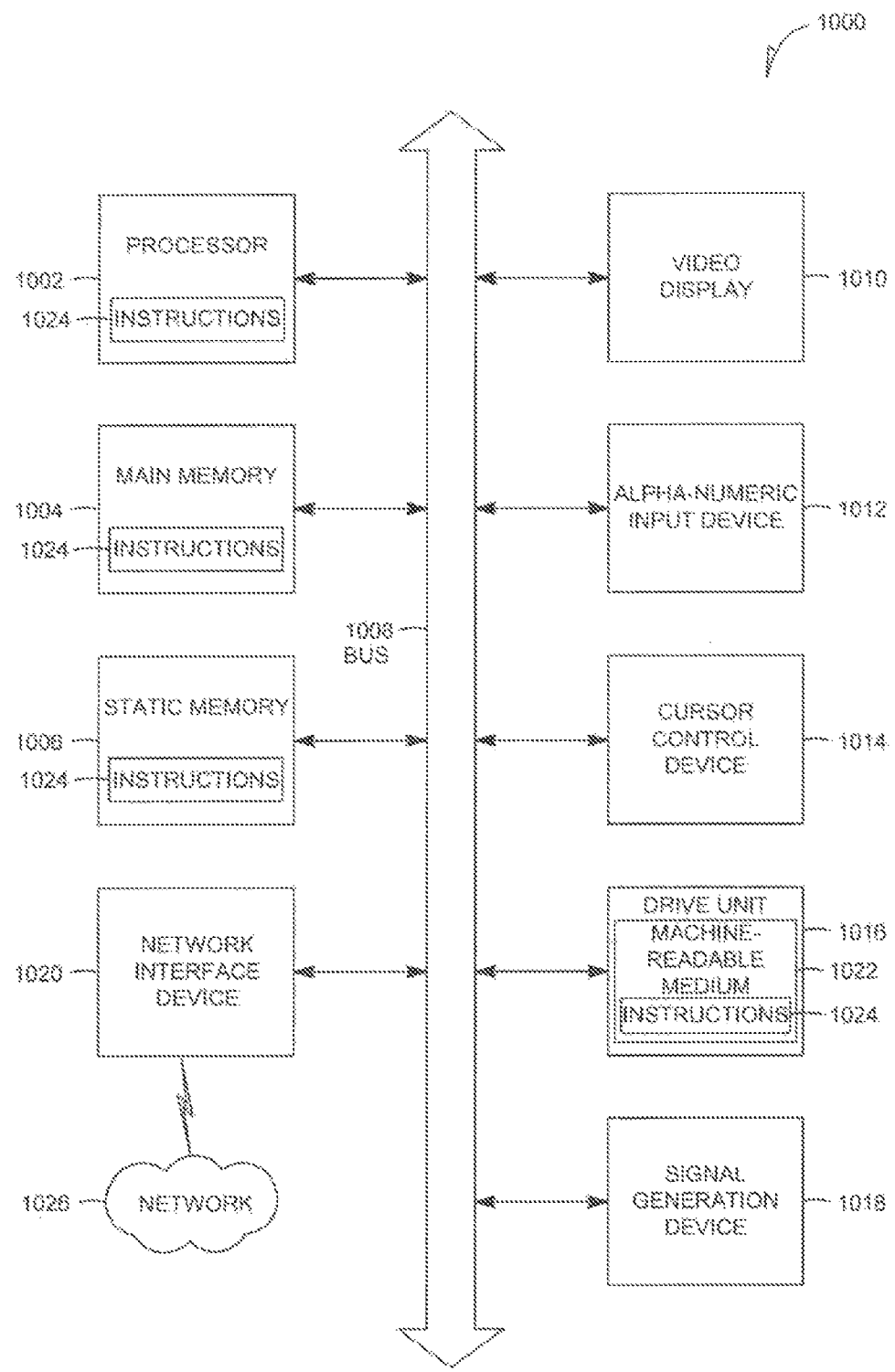
FIG. 10 is a block diagram that shows a computer processing system within which a set of instructions for causing the computer to perform any one of the methodologies discussed herein may be executed.

FIG. 10 is a block diagram of a machine in the example form of a computer system 1000 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

In some contexts, a computer-readable medium may be described as a machine-readable medium. The disk drive unit 1016 includes a machine-readable medium 1022 on which is stored one or more sets of data structures and instructions 1024 (e.g., software) embodying or utilizing any one or more of the methodologies or functions described herein. The instructions 1024 may also reside, completely or at least partially, within the static memory 1006, within the main memory 1004, or within the processor 1002 during execution thereof by the computer system 1000, with the static memory 1006, the main memory 1004 and the processor 1002 also constituting machine-readable media.

While the machine-readable medium 1022 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 1024. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms.

Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of implementing a working context for business applications, the method comprising:
providing a category-definition interface for associating one or more favorite business objects with one or more context categories, the category-definition interface including:
a context-category menu that includes a plurality of context categories, each context category being selectable for associating favorite business objects with that context category;
a business-object menu that includes one or more business objects corresponding to a selected context category, the business-object menu including for each business object a selectable favorite-business-object indicator that indicates whether that business object is a favorite business object for the selected context category; and
a working-context menu for specifying a working context based on one or more identified context categories from the context-category menu;
defining a plurality of context categories by accessing category-definition values through the category-definition interface, each context category being associated with one or more corresponding favorite business objects;
specifying a working context by accessing working-context values through the working-context menu of the category-definition interface, the working context including at least one identified context category from the plurality of context categories;

storing values for the context categories and the working context in a context-category data structure that associates each context category with the one or more corresponding favorite business objects and that identifies the working context from the plurality of context categories, the context-category data structure being stored in a non-transitory computer-readable medium;

providing a user interface for associating the working context with one or more business applications in accordance with the context-category data structure, the user interface including:
a business-object selection menu for selecting one or more favorite business objects from the at least one identified context category included in the working context; and
a business-application selection menu for selecting at least one business application for the working context; and applying the working context to a business application by accessing user-interface values through the user interface, the user-interface values providing a selection of the business application and further providing the one or more favorite business objects corresponding to the at least one identified context category included in the working context to the business application for an execution of the business application, the user interface operating to access the context-category data structure to obtain values for the one or more favorite business objects corresponding to the at least one identified context category included in the working context.

2. The method of claim 1, wherein the business-object menu of the category-definition interface includes a selectable display for all business objects corresponding to the selected context category or all favorite business objects corresponding to the selected context category.

3. The method of claim 1, wherein
the plurality of context categories and the working context are associated with a first user that makes a request for the execution of the business application, the context-category data structure associating the plurality of context categories with the first user, and
applying the working context to the business application includes identifying the working context associated with the first user in response to the first user's request for the execution of the business application, the user interface operating to identify the first user and to access values corresponding to the first user from the context-category data structure.

4. The method of claim 1, wherein applying the working context to the business application includes automatically pre-filling the one or more business objects corresponding to the at least one identified context category into corresponding fields of the business application.

5. The method of claim 1, wherein applying the working context to the business application includes loading the one or more business objects corresponding to the at least one identified context category into a business-object menu that is accessible within the execution of the business application for loading the one or more business objects into corresponding fields of the business application.

6. The method of claim 1, wherein applying the working context to the business application includes loading the one or more business objects corresponding to the at least one identified context category into a business-object menu that is accessible prior to the execution of the business application for loading the one or more business objects into corresponding fields of the business application.

7. The method of claim 1, wherein each business object includes at least one attribute that corresponds to business-object data.

8. The method of claim 1, wherein the defined context categories include at least one of a company code that identifies a company, a segment that identifies a product, a business area that identifies a geographic region, a profit center group that identifies a source of cash inflow, or a cost center group that identifies a source of cash outflow.

9. A non-transitory computer-readable medium that stores a computer program implementing a working context for business applications, the computer program including instructions that, when executed by at least one computer, cause the at least one computer to perform operations comprising:

providing a category-definition interface for associating one or more favorite business objects with one or more context categories, the category-definition interface including:
a context-category menu that includes a plurality of context categories, each context category being selectable for associating favorite business objects with that context category;
a business-object menu that includes one or more business objects corresponding to a selected context category, the business-object menu including for each business object a selectable favorite-business-object indicator that indicates whether that business object is a favorite business object for the selected context category; and
a working-context menu for specifying a working context based on one or more identified context categories from the context-category menu;

defining a plurality of context categories by accessing category-definition values through the category-definition interface, each context category being associated with one or more corresponding favorite business objects;

specifying a working context by accessing working-context values through the working-context menu of the category-definition interface, the working context including at least one identified context category from the plurality of context categories;

storing values for the context categories and the working context in a context-category data structure that associates each context category with the one or more corresponding favorite business objects and that identifies the working context from the plurality of context categories, the context-category data structure being stored in a related non-transitory computer-readable medium;

providing a user interface for associating the working context with one or more business applications in accordance with the context-category data structure, the user interface including:
a business-object selection menu for selecting one or more favorite business objects from the at least one identified context category included in the working context; and
a business-application selection menu for selecting at least one business application for the working context; and applying the working context to a business application by accessing user-interface values through the user interface, the user-interface values providing a selection of the business application and further providing the one or more favorite business objects corresponding to the at least one identified context category included in the working context to the business application for an execution of the business application, the user interface operating to access the context-category data structure to obtain values for the one or more favorite business objects corresponding to the at least one identified context category included in the working context.

10. The computer-readable medium of claim 9, wherein the business-object menu of the category-definition interface includes a selectable display for all business objects corresponding to the selected context category or all favorite business objects corresponding to the selected context category.

11. The computer-readable medium of claim 9, wherein
the plurality of context categories and the working context are associated with a first user that makes a request for the execution of the business application, the context-category data structure associating the plurality of context categories with the first user, and
applying the working context to the business application includes identifying the working context associated with the first user in response to the first user's request for the execution of the business application, the user interface operating to identify the first user and to access values corresponding to the first user from the context-category data structure.

12. The computer-readable medium of claim 9, wherein applying the working context to the business application includes automatically pre-filling the one or more business objects corresponding to the at least one identified context category into corresponding fields of the business application.

13. The computer-readable medium of claim 9, wherein applying the working context to the business application includes loading the one or more business objects corresponding to the at least one identified context category into a business-object menu that is accessible within the execution of the business application for loading the one or more business objects into corresponding fields of the business application.

14. The computer-readable medium of claim 9, wherein applying the working context to the business application includes loading the one or more business objects corresponding to the at least one identified context category into a business-object menu that is accessible prior to the execution of the business application for loading the one or more business objects into corresponding fields of the business application.

15. The computer-readable medium of claim 9, wherein each business object includes at least one attribute that corresponds to business-object data.

16. The computer-readable medium of claim 9, wherein the defined context categories include at least one of a company code that identifies a company, a segment that identifies a product, a business area that identifies a geographic region, a profit center group that identifies a source of cash inflow, or a cost center group that identifies a source of cash outflow.

17. An apparatus for implementing a working context for business applications, the apparatus comprising at least one processor configured to perform operations for processor-implemented modules including:
a category-definition-interface module that provides a category-definition interface for associating one or more favorite business objects with one or more context categories, the category-definition interface including:
a context-category menu that includes a plurality of context categories, each context category being selectable for associating favorite business objects with that context category;
a business-object menu that includes one or more business objects corresponding to a selected context category, the business-object menu including for each business object a selectable favorite-business-object indicator that indicates whether that business object is a favorite business object for the selected context category; and
a working-context menu for specifying a working context based on one or more identified context categories from the context-category menu;
a category-defining module that defines a plurality of context categories by accessing category-definition values through the category-definition interface, each context category being associated with one or more corresponding favorite business objects, and the category-defining module further operating to store values for the context categories in a context-category data structure that associates each context category with the one or more corresponding favorite business objects, the context-category data structure being stored in a non-transitory computer-readable medium;
a working-context module that specifies a working context by accessing working-context values through the working-context menu of the category-definition interface, the working context including at least one identified context category from the plurality of context categories, and the working-context module further operating to store values in the context-category data structure for identifying the working context from the plurality of context categories;
a user-interface module that provides a user interface for associating the working context with one or more business applications in accordance with the context-category data structure, the user interface including:
a business-object selection menu for selecting one or more favorite business objects from the at least one identified context category included in the working context; and
a business-application selection menu for selecting a business application from the one or more business applications; and
a business-application module that applies the working context to a business application by accessing user-interface values through the user interface, the user-interface values providing a selection of the business application and further providing the one or more favorite business objects corresponding to the at least one identified context category included in the working context to the business application for an execution of the business application, the user interface operating to access the context-category data structure to obtain values for the one or more favorite business objects corresponding to the at least one identified context category included in the working context.

18. The Apparatus of claim 17, wherein applying the working context to the business application includes automatically pre-filling the one or more business objects corresponding to the at least one identified context category into corresponding fields of the business application.

19. The Apparatus of claim 18, wherein applying the working context to the business application includes loading the one or more business objects corresponding to the at least one identified context category into a business-object menu that is accessible within the execution of the business application for loading the one or more business objects into corresponding fields of the business application.

20. The Apparatus of claim 18, wherein applying the working context to the business application includes loading the one or more business objects corresponding to the at least one identified context category into a business-object menu that is accessible prior to the execution of the business application for loading the one or more business objects into corresponding fields of the business application.

* * * * *